United States Patent [19]
Barrett et al.

[11] Patent Number: 5,373,120
[45] Date of Patent: Dec. 13, 1994

[54] LINEAR DOOR MOTOR SYSTEM FOR ELEVATORS

[75] Inventors: David W. Barrett, East Hartland; Richard E. Peruggi, Glastonbury; Louis Bialy, Simsbury; Ernest P. Gagnon, Manchester, all of Conn.

[73] Assignee: Otis Elevator Company, Farmington, Conn.

[21] Appl. No.: 29,203

[22] Filed: Mar. 10, 1993

[51] Int. Cl.[5] ............................................. B66B 13/14
[52] U.S. Cl. ...................................... 187/316; 49/120
[58] Field of Search ................... 187/30, 51, 52 R, 54, 187/56, 58, 103; 49/120, 118, 117

[56] References Cited

U.S. PATENT DOCUMENTS

| | | |
|---|---|---|
| 3,462,883 | 8/1969 | Reeks et al. |
| 3,708,915 | 1/1973 | Davey |
| 3,793,944 | 2/1974 | Grubich et al. |
| 3,872,622 | 3/1975 | Berk |
| 3,891,907 | 6/1975 | Lenzkes et al. |
| 3,895,585 | 7/1975 | Schwärzler |
| 4,067,144 | 1/1978 | Ogishi |
| 4,090,113 | 5/1978 | Ogishi |
| 4,188,552 | 2/1980 | Brimer |
| 4,305,481 | 12/1981 | Hmelovsky et al. ............. 187/29 R |
| 4,365,442 | 12/1982 | Speer |
| 4,698,876 | 10/1987 | Karita ................................. 16/102 |
| 4,858,452 | 8/1989 | Ibrahim |
| 4,876,765 | 10/1989 | Karita ................................. 16/102 |
| 5,134,324 | 7/1992 | Sakagami et al. |
| 5,172,518 | 12/1992 | Yshino ............................... 49/360 |

FOREIGN PATENT DOCUMENTS 3-264486 11/1991 Japan.
1148444 4/1969 United Kingdom.

OTHER PUBLICATIONS

"Linear direct drives featuring three-phase asynchronous motors", a brochure from Automation & Servo Technologies, Inc., a U.S. representative of Krauss Maffei AG.

Primary Examiner—Steven L. Stephan
Assistant Examiner—Robert Nappi

[57] ABSTRACT

A linear motor is used to actuate an elevator door in response to a control signal for counteracting rotational torque caused by a variable-length moment arm about the center of gravity of the door by varying the magnitude of a linear force exerted on the door acting through a fixed-length moment arm about the center of gravity of the door for providing an opposing rotational torque, thereby counteracting the rotational torque caused by the normal force. The first and second rotational torques may be controlled to decrease and increase linearly as the door goes through its motion. In this way, the velocity profile varies in a curve similar to one side of the major axis of an ellipse. The normal force may be provided so as to levitate the door to reduce gravitational forces acting on door rollers. The control may be carried out in an open- or closed-loop fashion.

20 Claims, 15 Drawing Sheets

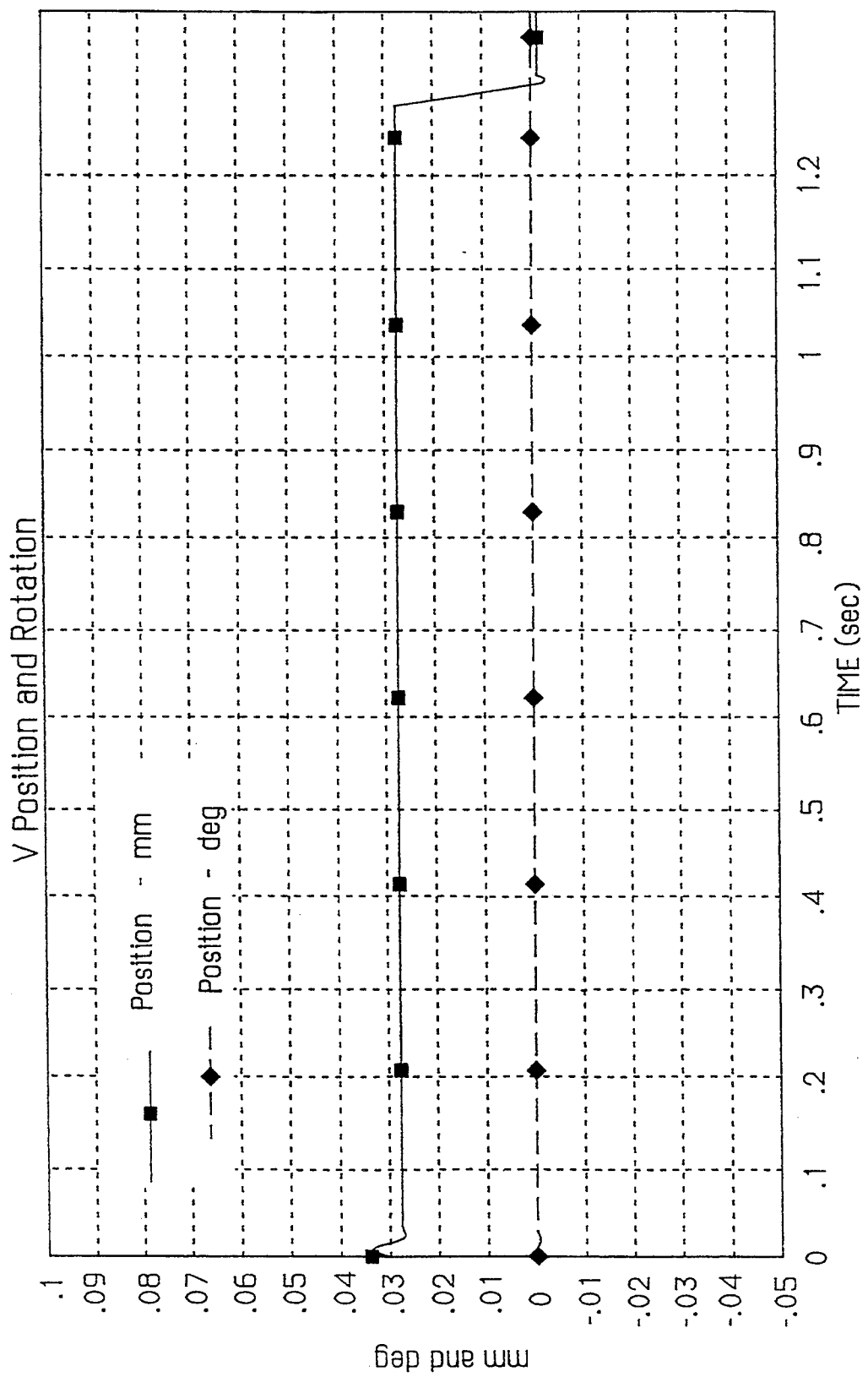

5,373,120

LINEAR DOOR MOTOR SYSTEM FOR ELEVATORS

TECHNICAL FIELD

This invention relates to elevators and, more particularly, to means and methods for actuating elevator doors.

BACKGROUND OF THE INVENTION

Elevator door systems generally consist of single or dual sliding doors which are normally powered to provide for automatic opening and closing. The actual door panels slide open in a horizontal plane to provide access and closed to provide security to the elevator passengers. Traditionally, these automatic operation systems have been powered by an electric motor which provides rotational torque, as shown in FIG. 1. A mechanical linkage system is there shown that converts the rotational force produced by the motor into a linear force required to move the door. Two common forms of mechanical linkages used include a two-bar linkage and a threaded lead screw.

The concept being advanced by the present invention is to replace the combination of rotational motor and linkage with a linear electric motor. Linear electric motors have been suggested in the prior art for operating sliding doors and elevator doors.

For example, U.S. Pat. No. 3,462,883 shows a sliding door actuated by a linear induction motor having a control circuit including a plurality of switches sequentially actuated by the door moving in either direction for effecting variable deceleration. Speed sensing is also used to modify the deceleration control.

U.S. Pat. Nos. 4067,144 and 4,090,113 disclose a method of driving a door of an automatic door assembly by a linear motor mounted within the automatic door assembly. The door is driven by a normal propulsion force which is augmented during a final portion of the stroke of the door, thereby overcoming the reaction force of cushioning devices provided near the ends of the door stroke.

U.S. Pat. No. 3,872,622 discloses a linear motor for driving a pair of sliding doors, wherein the stator is fixed relative to the frame of the doors and its armature connected to a pulley and rope assembly, which is movable therewith to effect opening of the doors. Means are provided for adjusting the axis of rotation of the pulleys in three planes to adjust the tension on the rope and adjust the alignment of the pulleys.

Linear motors are known for various types of doors, as shown, for example, in U.S. Pat. Nos. 5,134,324; 4,858,452; 4,188,552; 3,793,944; 4,365,442; and 3,708,915.

Various speed control and control circuits are known for linear motors, such as shown in U.S. Pat. No. 3,891,907 and British Patent Specification 1,148,144.

However, inasmuch as it is desirable to place the linear motor at a top or bottom end of the door to be actuated, there will be developed an undesirable torque about the doors due to the moment arm for the horizontal force. This moment arm, which is the distance between the point of horizontal force application and the door unit center of gravity, remains constant over the door travel distance. This undesirable torque may be substantial and for a rapidly accelerating door will produce rotation or oscillation of the door about its center of gravity. As can be seen in FIG. 1, the prior art solves this problem for high-acceleration doors by placing the holding point somewhere near the middle of the door or close to the center of gravity so as to minimize a rotational torque problem that would otherwise arise.

In addition to the desirable horizontal force, the linear motor also produces an attractive force between the primary and secondary of the motor. In previous art unrelated to door systems, for example, a linear motor for lifting an elevator in the hoistway, this force was opposed by rollers or bearings located on the primary parts, thus maintaining the air gap required between the secondary and primary components of the motor.

DISCLOSURE OF THE INVENTION

An object of the present invention is to control an elevator door with a linear motor and at the same time minimize undesirable rotational torques.

According to the present invention, an attractive force between a primary and a secondary of a linear motor is used to counterbalance torques caused by driving the door at locations other than through the door's center of gravity.

According further to the present invention, an elevator door is moved with a linear motor by providing a control signal that varies in magnitude with movement of the door, for counteracting a first rotational torque on the elevator door caused by a normal force exerted on the door acting through a variable-length moment arm about a center of gravity of the door and, in response to the control signal, varying the magnitude of a linear force exerted on the door acting through a fixed-length moment arm about the center of gravity of the door, for providing a second rotational torque opposing the first rotational torque, thereby counteracting the first rotational torque.

In further accord with the present invention, for a door opening or closing operation, the first and second rotational torques decrease with a decreasing length of the variable moment arm to zero at a point where the variable-length moment arm is zero, whereafter the first and second rotational torques increase with an increasing length of the variable-length moment arm until the door opening or closing operation is completed.

In still further accord with the present invention, the first and second rotational torques decrease and increase linearly with door position.

According still further to the present invention, a specific force and velocity profile may be used to provide torque counterbalance over the entire travel distance of the door.

Further in accordance with the present invention, for a door opening or closing operation, the horizontal velocity of the door varies in a curve approximating an ellipse on one side of its major axis.

Further still in accord with the present invention, the normal force is used to levitate the door to reduce gravitational forces acting on horizontal door motion guide means.

In still further accord with the present invention, the normal force is held constant. The normal force is selected in such a way as to achieve partial magnetic levitation of the door to reduce the gravity load on the door rollers and other suspension components, thus prolonging their life and reducing acoustic noise.

Further in accordance with the present invention, one or more control signals are provided in response to a sensed door position signal. Control of the linear motor normal force may be achieved through digital techniques to provide a more perfect torque balance. The control may be implemented by sensing the door position and velocity and adjusting the motor drive frequency and slip to obtain the desired normal and linear force simultaneously. A specific force and velocity profile may be selected to provide torque counterbalance over the entire travel distance of the door.

In further accord with the present invention, the control signals may be provided in open-loop fashion in response to a door open or door close command signal.

The concepts taught herein result in the replacement of the combination of rotational motor and linkage with a linear electric motor. This concept provides several significant advantages. The advantages include:
1. Significant decrease in the number of moving parts, which can provide much greater reliability and reduced wear on the door operator system;
2. Smoother and quieter operation through reduction of the linkage mass and door suspension loads;
3. Cost savings through simpler installation and maintenance; and
4. Graceful degradation of system performance in the event of malfunction.

These and other objects, features and advantages of the present invention will become more apparent in light of the detailed description of a best mode embodiment thereof, as illustrated in the accompanying drawing.

BRIEF DESCRIPTION OF THE DRAWING

FIG. 16 shows theoretical door vertical position and rotation plotted against time, which shows that the door is actually lifted a small amount during the position traverse, according to the present invention.

BEST MODE FOR CARRYING OUT THE INVENTION

Figure 2:
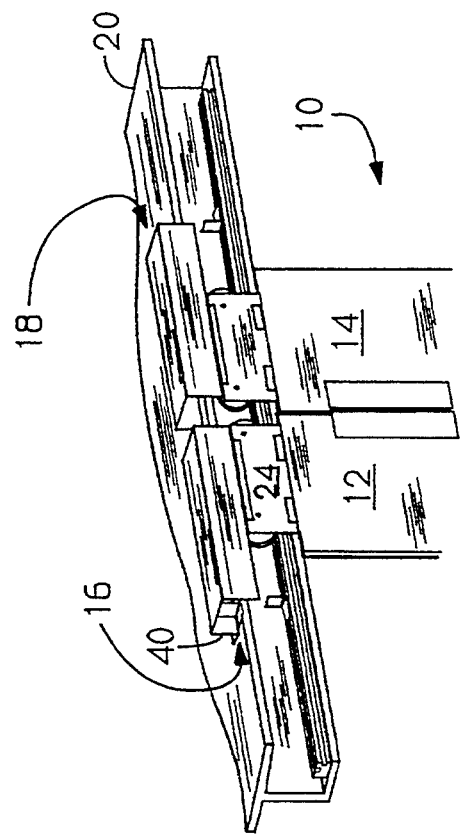
FIG. 2 shows a pair of elevator doors driven by linear motors, according to the present invention.
Figure 1:
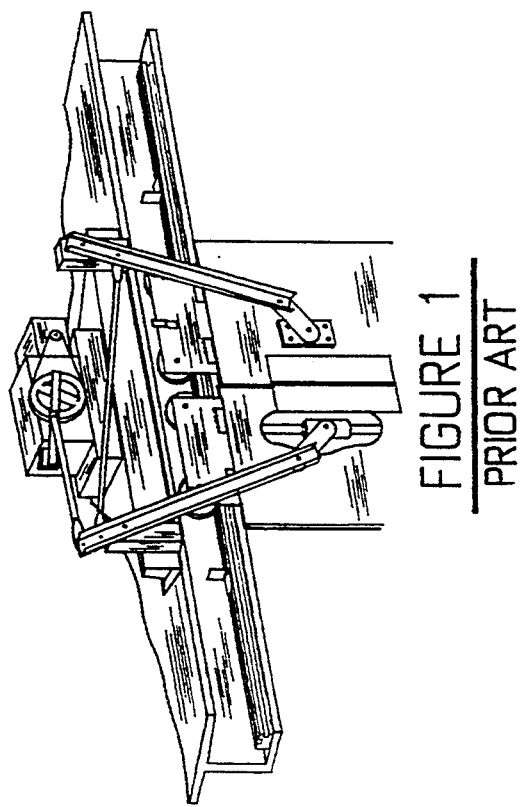
FIG. 1 shows a prior art AVOR operator wherein a rotational motion of the motor is translated into a linear motion by means of linkages.

FIG. 2 shows a pair 10 of elevator doors 12, 14 in a closed position whereby, according to the present invention, linear motor actuators 16, 18 are attached to both an overhead support 20 and the doors 12, 14 for opening and closing the doors 12, 14 in a reciprocating fashion similar to the opening and closing motion known from the device of FIG. 1.

Figure 3:
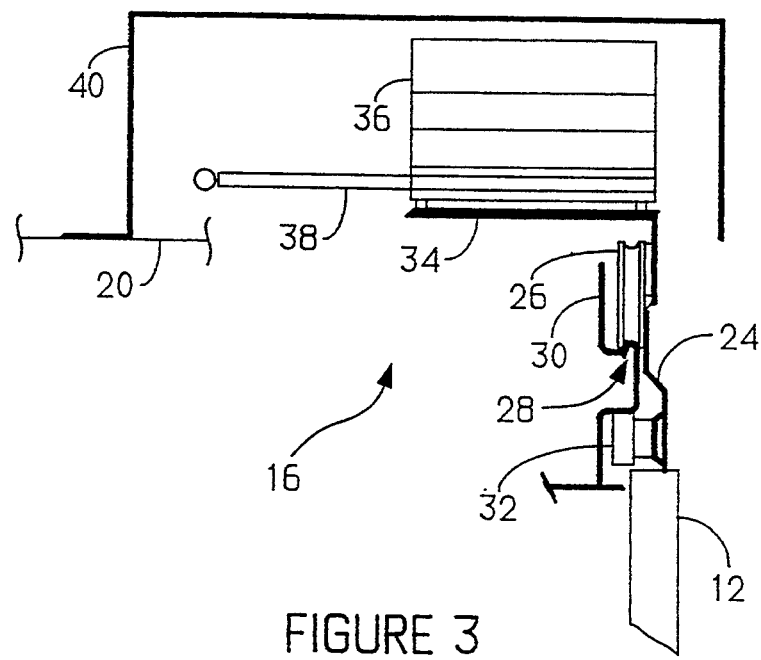
FIG. 3 shows a side view of a door motor mounting scheme, according to the present invention.

FIG. 3 shows a side view of the left door 12 attached to a door hanger 24, also shown in FIG. 2, which includes a roller 26 for rolling on a raised portion 28 of a door track 30 which may be shaped for rolling contact also with a second roller 32. The door track 30 may be attached to the support 20 of FIG. 2. The hanger 24 may also be used to support a reaction plate 34, sometimes called a secondary, of a linear motor including a separate primary 36 mounted on the support 20 by means, for example, of a mount 38. A dust cover 40 is also illustrated in both FIGS. 2 and 3.

It will be evident from the description of FIGS. 2 and 3 that the primary of the embodiment shown is mounted on the support 20, while the secondary is attached to the door and therefore moves with respect to the primary. The primary can take the form of a relatively small package of coils for being excited by one or more time-varying electric signals for generating time-varying electromagnetic fields that cause the secondary to move with respect to the primary.

Such a linear motor is provided by Krauss Maffei, which also provides linear direct drives for controlling the motion of the linear motor. Such may be found in the product line of Krauss Maffei under the Series No. LIM-E Series Single-Cam Linear Motors. A brochure describing this series is available from a U.S. representative of Krauss Maffei AG, i.e., from Automation & Servo Technologies, Inc., at 1 Tunxis Road, Simsbury, Conn., USA. These drives and motors have known characteristics and can be adapted for the elevator application disclosed herein. In general, the control system comprises a transistor pulse-controlled AC inverter which is responsive to control signals from a guidance system for providing, for example, three-phase power to the coils of the primary. The guidance system is responsive to set points and may also be part of a closed loop, for example, responsive to a sensed position signal having a magnitude indicative of the relative displacement of the primary along the secondary. A linear measuring system is provided by Krauss Maffei that is suitable for such a linear measurement. However, it will be understood that such a control system need not be closed-loop, but may be open-loop; similarly, it need not be implemented in a position-controlled loop, but may be implemented in a speed-regulated drive, a single-axis positioning drive, a position-regulated drive, a linear power actuator or any other desired configuration.

Figure 4:
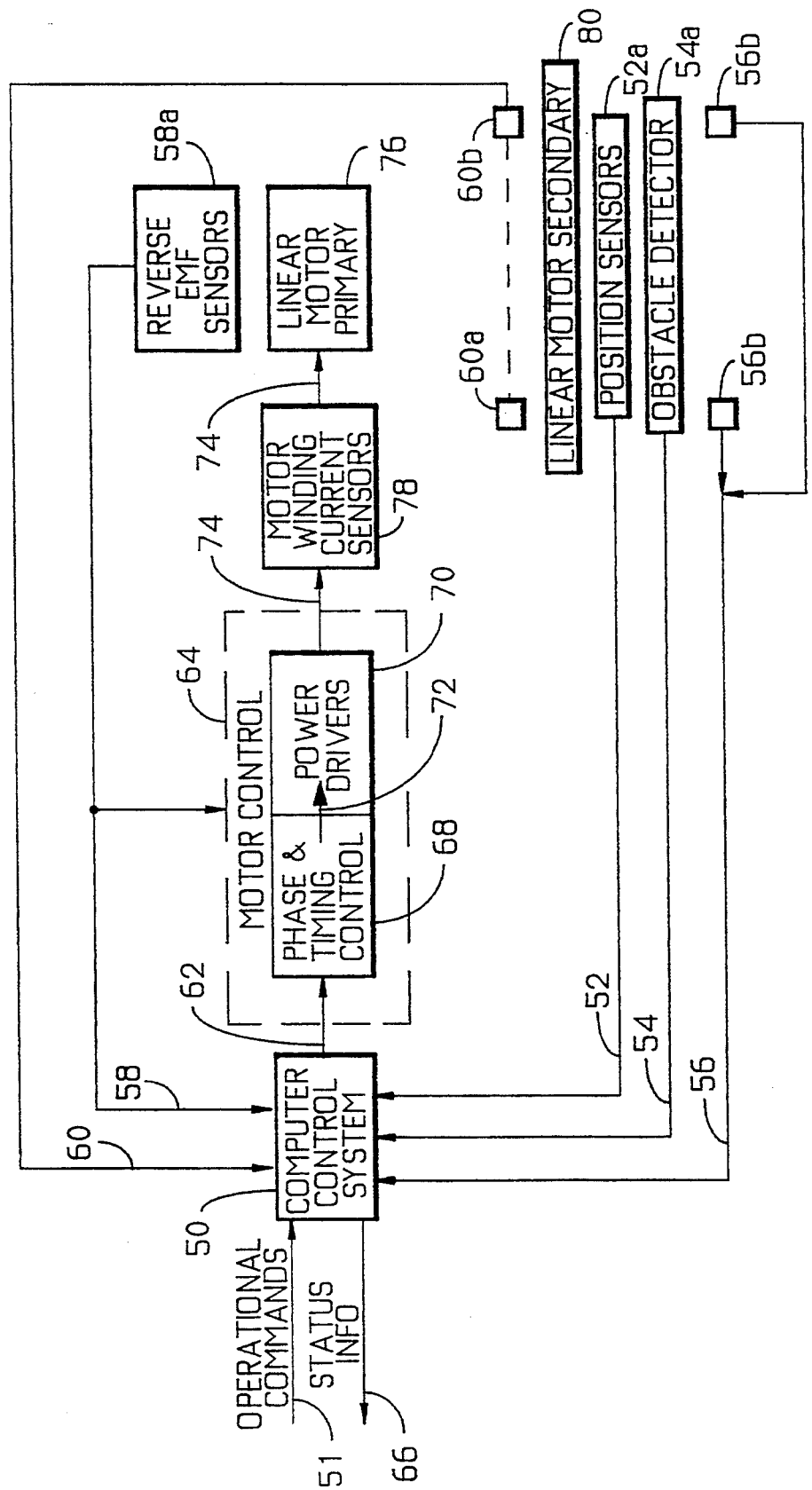
FIG. 4 shows a control system, according to the present invention.

For example, and not by way of limitation, FIG. 4 shows an advanced door system drive block diagram. A computer control system 50 is responsive to operational commands and some or all of a plurality of sensed signals, including a sensed position signal on a line 52, an obstacle detector signal on a line 54, a travel limit signal on a line 56, a reverse EMF sensed signal on a line 58 and a force/load sensed signal on a line 60, for providing a control signal on a line 62 to a motor control 64, which may also be responsive to the reverse EMF sensed signal on the line 58. The computer control system 50 may also provide status information on a line 66. The computer control system receives operational commands from other elevator or building systems or subsystems on the signal line 51 to initiate the various operational features of the door system (e.g., open, closed, stop, reverse, etc.). As mentioned, the computer control system 50 may also provide other systems with status information on the line 66 describing the state of the door system. The computer control system will accept inputs from the various sensors and, based on algorithms stored within, the computer control system will exercise such functions as generating the motion profiles for the door, calculating the motor drive phase and current, controlling the door position, velocity and acceleration (either through open-loop or closed-loop control), monitoring the performance of the door system, and any other functions deemed necessary to achieve the desired operational performance of the door system.

If used in a position-based closed-loop system, the position sensor 52a signal on the line 52 will be fed into a comparator (not shown) where it will be compared with a position command signal, which may be a signal on the line 51 or which may be generated within the computer control system 50 itself (in which case it is not shown). The comparator will provide a difference signal which may be provided to a compensation network, such as a proportional control, a proportional-plus-integral control, a proportional-plus-integral-plus derivative control, or any other compensation network which may be desired. The compensation network will provide the control signal on the line 62. Of course, instead of a comparator, as described above in more or less analog fashion, the entire process may be carried out digitally by discrete components or by software in a general purpose microprocessor, as would be known to one of ordinary skill in the art of implementation of control system algorithms.

The motor control 64 may comprise circuits 68 that will generate the appropriate timing and phase relationships required to produce the desired forces (linear and/or normal) in the linear motor. Power drivers 70 will amplify signals on a line 72 from the phase and timing control logic to deliver the appropriate electrical power on a Line 74 to the linear motor primary windings 76. Of course, the signal on the line 74 may be sensed by motor winding current sensors 78, which may be any type of current sensor desired. The motor winding current sensors 78 will provide sensed signals (not shown) back to the computer control system 50 for the purpose of closed-loop feedback, such as already described in connection with the position sensors 52a. It should be realized that other types of sensed signals may be used in lieu of the sensors described herein for a closed-loop control system for controlling the doors. Thus the motor control 64 may operate either open-loop, based on predefined patterns, or may operate in a closed-loop manner, also based on such patterns but also using feedback from the optional motor winding current sensors and/or the optional door position sensors or any other desired sensor, such as a velocity-based feedback loop, or based on some other sensed parameter.

The linear motor of FIG. 4, of course, consists of two parts. The primary 76 consists of a number of poles around which the motor windings are placed. A secondary 80 consists of a structure which moves in a transverse linear direction relative to the primary in response to magnetic fields generated by the primary. The secondary provided by the above-cited vendor, i.e., Krauss-Maffei, is segmented to improve efficiency. A segmented secondary is one in which the electrical conductors are embedded in slots in the secondary backiron, a practice which is common for rotating induction motors. However, according to the teachings of the present invention, it is preferable to use a solid secondary consisting of a magnetically permeable material (such as an iron or steel bar) covered with an electrically conductive layer, such as copper or aluminum sheet, which helps to reduce vibrations and hence door noise, which in certain applications is more important than efficiency. The use of a permanent magnet secondary was considered but was rejected due to the possibility of collecting metal particles in an elevator hoistway environment.

It should be realized that the sensors shown in FIG. 4 are optional and may be included in the electronic drive shown in FIG. 4 to provide any desired degree of control or other information to other parts of the drive system. As already mentioned, typical sensors might include a feedback device 52a that measures the position of the door as it moves back and forth. Sensors 78 that measure the current flowing through the windings of the linear motor primary can also be used to both control and monitor the power drive to the primary. Travel limit sensors 56a, 56b may be used to sense discrete positions of door travel. Reverse EMF sensors 58a may be used to monitor the rate of motion of the linear motor. An obstacle detector 54a may be included in the door drive system to sense the presence of obstacles in the path of the door, allowing the computer control to select a control algorithm that avoids contact with the obstacle. Force and/or load sensors 60a, 60b may be included in the drive system to monitor both linear and normal forces and loads acting on the linear motor. All of these sensors are merely illustrative of useful devices that may be used in an actual implementation but need not be.

Figure 5:
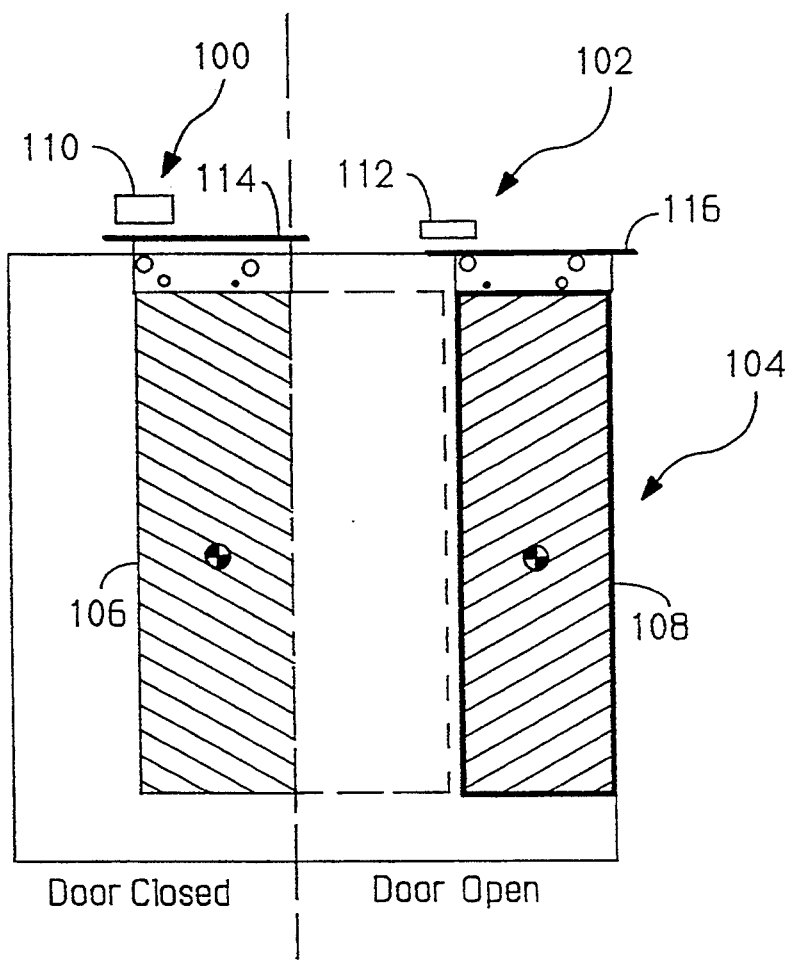
FIG 5 shows a linear motor powered elevator door system, according to the present invention.

FIG. 5 shows a center opening elevator door with two linear motors 100, 102 that are employed with each motor driving one side of a pair 104 of doors 106, 108. The door 106 is shown in the closed position, while the door 108 is shown in the open position. Of course, this would not be a normal situation, since both doors would normally be either opened or closed. Each linear motor primary consists of a small (approximately 100×150 mm) electrically-active primary 110, 112, which is securely mounted to the car frame, such as the Support 20 of FIG. 2, as shown further in FIG. 3. An electrically passive secondary 114, 116 or reaction plate (approximately 760×100 mm) is mounted to the movable door, as described previously in connections with FIGS. 2 and 3. The configuration shown in FIG. 5 has the linear drive system mounted on top of the car, but such is not absolutely necessary to practice the invention. Of course, it should also be understood that the invention can be used with a single moving door, as opposed to the pair 104 of moving doors shown in FIG. 5.

Referring back to FIG. 3, the secondary or reaction plate 34 of that figure is simply an L-shaped extension to the existing car door hanger 24. The secondaries of FIG. 5 may be similar. FIG. 3 also shows a hinged (floating) mount for the primary, which has been described above. The top mounting that has been disclosed, as opposed in detail above to bottom mounting, was chosen to provide a relatively clean environment for the linear drive system. The cleanliness of the reaction plate is further improved by using the dust cover 40 of FIG. 3 over the entire assembly.

It should be emphasized again that the primary motor mounting scheme shown in FIG. 3 is a floating mount where the primary is free to move in the vertical plane but is restrained in the horizontal plane; such, however, is not the only approach. Another, better approach is a fixed mounting where the linear motor primary is restrained in both the horizontal and vertical planes. The advantages of the fixed mount will be explained subsequently.

Figure 6:
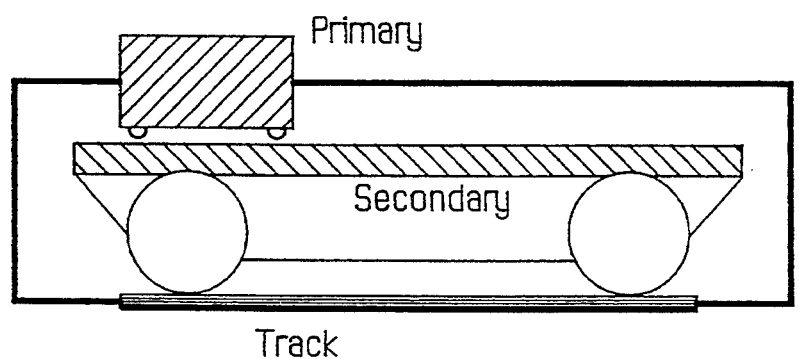
FIG. 6 shows a linear motor schematic for showing that in addition to the linear or door propulsion force generated by the motor, a significant normal attraction force between the primary and secondary (approximately 0.5 to ten times the propulsion force) is generated, which can be used advantageously, according to the present invention, for levitating the door to reduce gravitational forces acting on horizontal door movement guide means and for counterbalancing undesired torques.
Figure 7:
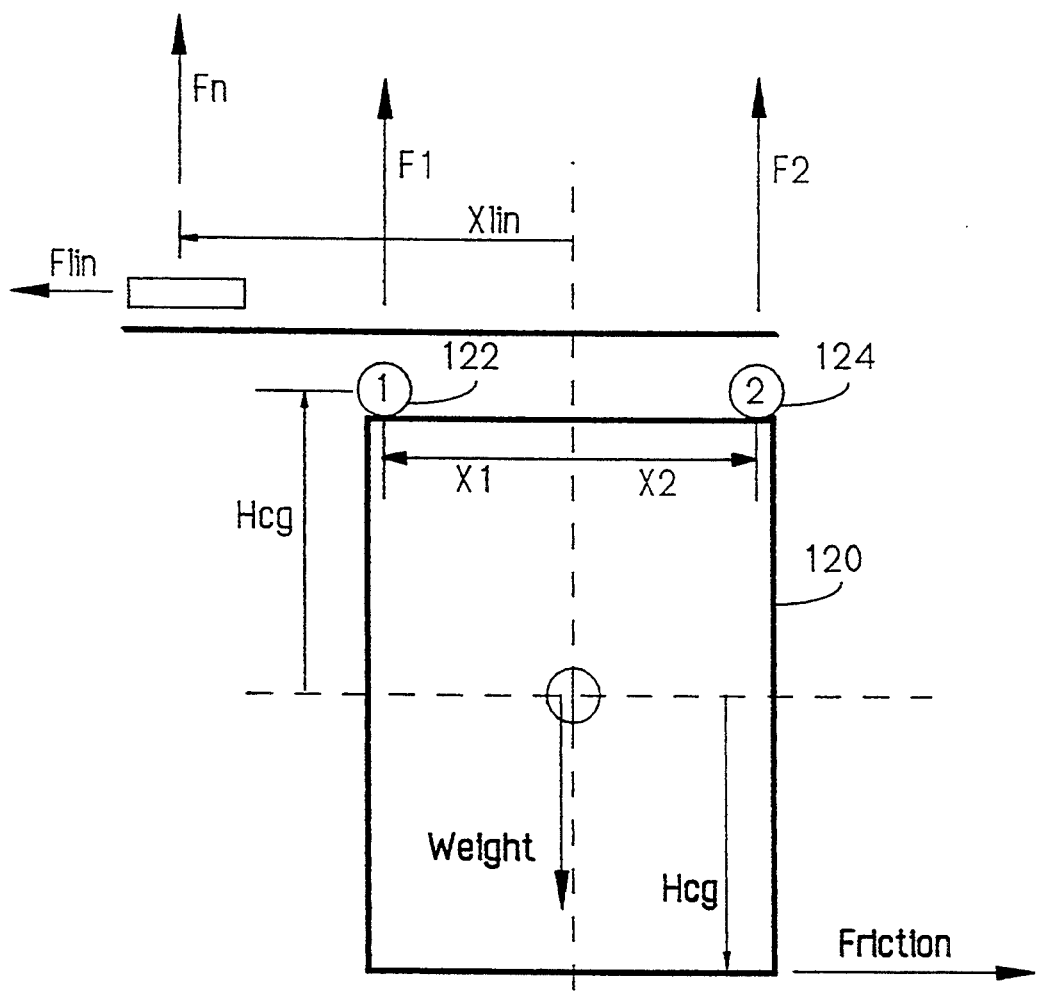
FIG. 7 illustrated door force components controlled, according to the present invention.

One of the major factors to ensure consistent performance of the linear motor is to accurately maintain the air gap clearance between the primary and the secondary elements of the motor. The linear motor in normal operation produces not only the desired linear propulsion force but also an attractive force between the primary and secondary elements of the motor, as shown in FIGS. 6 and 7. As suggested in FIG. 7 in the right-hand side of FIG. 5 for the door-open condition, the linear motor primary may be centered above the left edge of the door. This attractive force is denoted by the term "normal force" herein. The normal force for linear motors depends on the exact design and electrical characteristics of the motor but, in general, may be characterized as being between 0.5 and 10 times the desired linear force produced. This force will tend to draw the primary and secondary elements of the linear motor together and must be controlled to maintain a consistent air gap between the two elements. The two primary mounting schemes described above use different schemes to control the air gap.

The floating primary mounting accomplishes the air gap control using a set of rollers, such as shown in FIG. 6, mounted on the same mounting as the secondary element. Since the primary is free to move in the vertical plane, all the normal force loads are restrained through the rollers, and a consistent air gap is maintained. In this case, the normal force is not available to counterbalance torques on the door. This system, using the vertically-floating primary, is self-adjusting in that the air gap is maintained by components of the primary and thus would not be affected by small changes in car/door geometry, such as those produced by temperature, stress and wear.

On the other hand, the mounting scheme wherein the primary is rigidly mounted to the car frame uses the door weight and suspension system to resist the normal force and thus maintain a consistent air gap. In this system, changes in car/door geometry must be accounted for to maintain a consistent air gap. This mounting method, however, has the advantage of torque cancellation using the normal force, and is the preferred approach, according to the invention.

With regard to door suspension loads, according to the present invention, driving an elevator door from the top, rather than from the center of gravity, causes additional forces to be imposed on the suspension. A force diagram of a typical elevator door 120 is shown in FIG. 7. When this door is accelerated, a torque in the plane of the door is produced by the moment arm $H_{cg}$ shown in FIG. 7. In general, this torque must be resisted by a difference in the loads on the two door suspension rollers 122, 124, shown as forces F1 and F2. However, with a linear motor system using a rigid mounting, the normal force ($F_n$) generated by the motor is used to generate another torque opposing and thus reducing or eliminating the acceleration torque.

Thus, as a result of a linear motor drive system, there are two primary forces acting on a door panel in the open position, as shown in FIG. 7. These are the primary propulsion force $F_{lin}$ and an attractive force between the primary and secondary denoted in FIG. 7 as $F_n$. As shown in the figure, the linear motor primary is centered above the left edge of the door. Thus, the linear force develops a torque around the center of gravity of the door. The torque magnitude is $F_{lin} \times H_{cg}$. The normal force existing in the linear motor also causes a torque around the center of gravity of the door. The magnitude of this torque is $F_n \times X_{cg}$, and the torque is in the opposite direction to that generated by the linear force. Thus if $F_{lin} \times H_{cg} = F_n \times X_{cg}$, the resultant force goes through the center of gravity of the door and there are no unbalanced torques.

For the reverse direction, the desired force $F_{lin}$ is reversed, and the direction of the resulting torque is also reversed. The direction of the normal force remains the same, however, due to door motion, the direction of the moment arm is reversed and thus a torque in the opposite direction is produced. Once again, the above equation holds, and the resultant force effectively goes through the center of gravity of the door and no unbalanced torques result.

Figure 8:
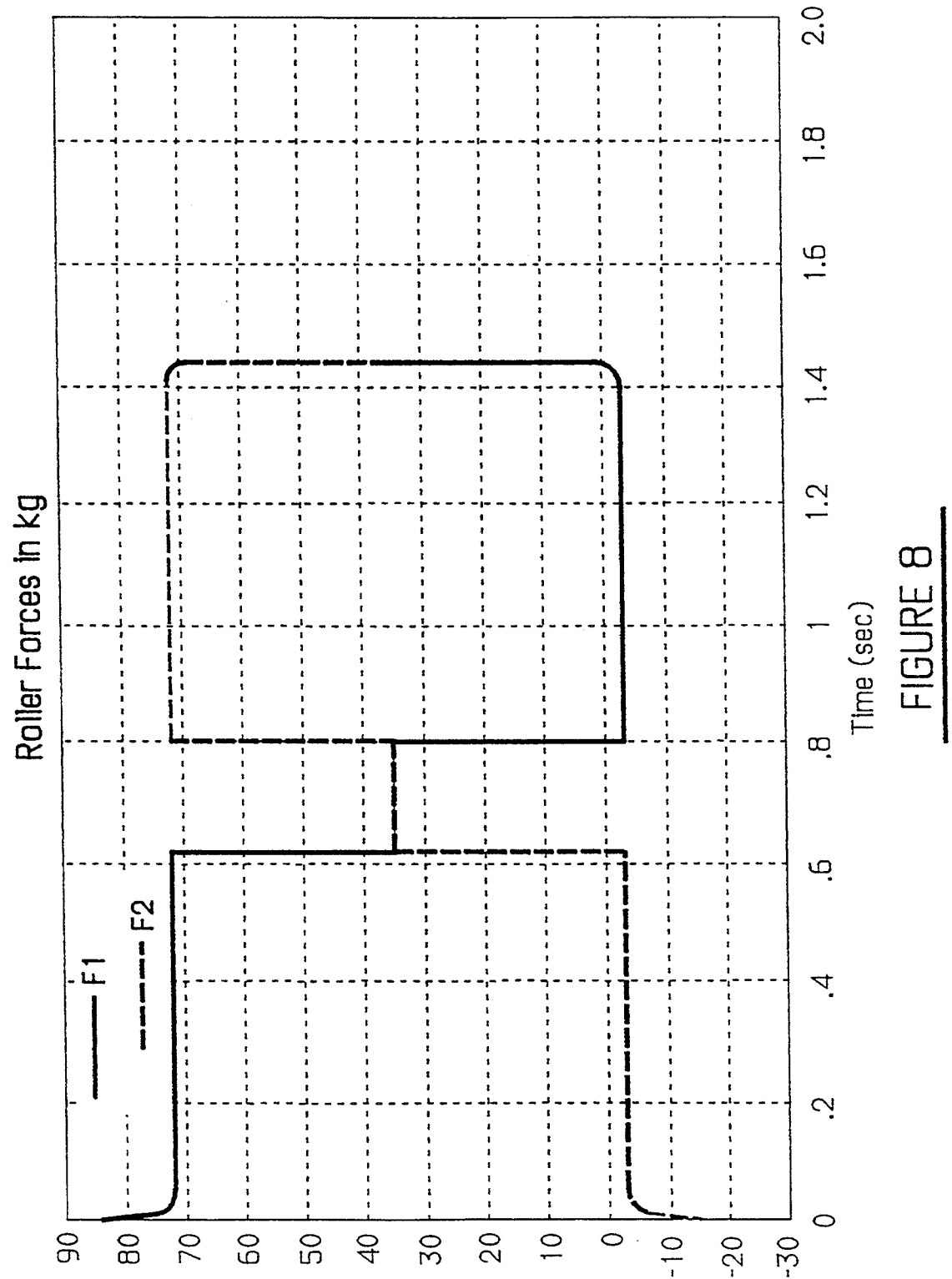
FIG. 8 shows loads on the rollers shown as a function of time for a floating primary mount.
Figure 9:
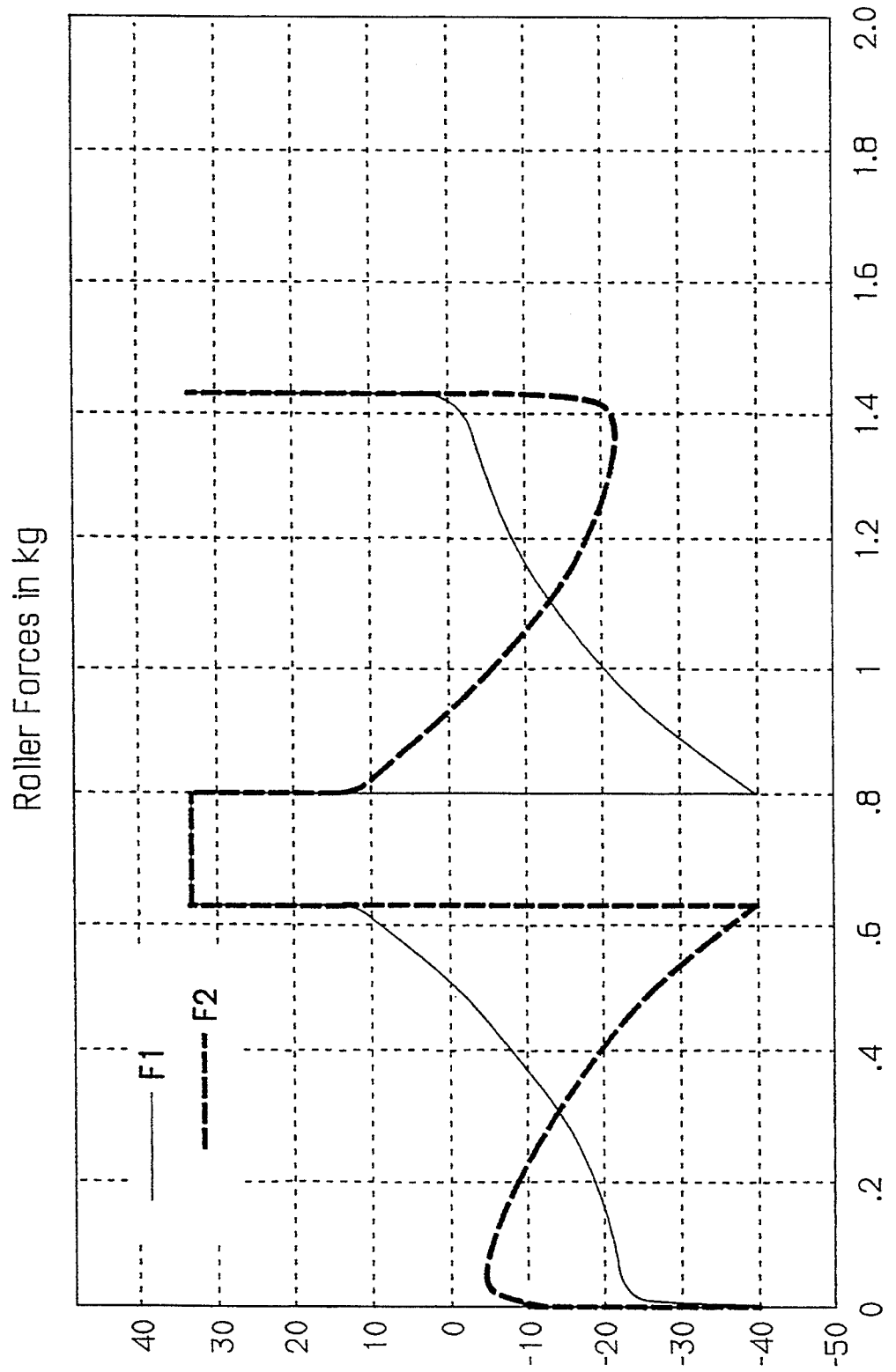
FIG. 9 shows roller forces for a rigid primary mounting.

A comparison of the suspension loads using a center-of-gravity, top-mounted, floating linear drive and top-mounted rigid linear drive is shown in FIGS. 8 and 9. The test case for this data is a single door having a travel of 609 mm and accelerating at a rate of 1290 mm/sec$^2$. A maximum door speed of 700 mm/sec is also utilized. This results in a profile accelerating for the first 0.62 seconds, a constant velocity region and then a deceleration beginning at time 0.8 seconds. The total door operating time is 1.4 seconds. In the example, the door weighs 68 kg.

For a center-of-gravity drive, such as in FIG. 1, there is no torque produced, and the suspension loads (F1 and F2 of FIG. 7) will remain constant at 34 kg/roller.

For the floating primary mount, the torque produced by the linear drive must be resisted by the door rollers. Loads on the rollers are shown as a function of time in FIG. 8 and show a force of between +72 and −4 kg must be produced to prevent door rotation. Note that the torque requirements reverse when the direction of the acceleration is reversed. Note also that one of the rollers must produce a negative force during a large portion of the action time; a negative force implies that the roller force must push the door down.

The force profile required using a rigid primary mounting is shown in FIG. 9. The assumption for this profile includes a ratio of normal-to-linear force of 5.0 and the primary portion of the linear motor located 304.6 mm from the center of gravity of the door at the initial position. The range of forces (F1) required from the leading edge roller is $-25$ to $+15$ kg, while the trailing roller (F2) requires $-5$ to $-40$ kg. During the constant speed section of the trajectory, it is assumed known normal force is produced. Note that over most of the trajectory, the required forces are negative, showing that the door has been levitated by the normal force. The reduced force on the rollers will cause a lower noise level to be achieved.

Having shown perfect torque cancellation at both ends of the door travel in connection with FIG. 7, it now remains to examine torque cancellation throughout the rest of the travel region. The normal force is assumed to be constant over the range of door travel and the torque created varies as the door motion changes the moment arm of the normal force. For the primary part of the motor mounted over an edge of the door and a door travel distance equal to the door width, the torque produced by the normal force varies linearly, with door position being zero when the door is exactly in the center of travel and reaching the maximum value, although different in sign, at each end of the travel.

According to the teachings hereof, a force profile is provided for driving the door that will result in a linear variation in torque produced by the force $F_{LINEAR}$, that exactly counterbalances the torque produced by the force $F_{NORMAL}$. This force profile specified is a linear variation of force with distance having a maximum magnitude at the end points of the travel range and being zero at the midpoint of the travel.

Thus, the force profile specified according to the teachings hereof can be described mathematically as $$F_{LINEAR} = F_{LINEARMAX} \times (1 - (2 \times X/D)),$$

where $F_{LINEARMAX}$ is the maximum value of $F_{LINEAR}$ and is set by the acceleration desired.
$X$ = current position of the door,
$D$ = final desired position of the door.

This force profile is symmetrical, having a maximum positive value at the initial condition (X=zero), and a maximum negative value at the final condition (X=D), and going to zero at the midpoint of travel (X=D/2). This is illustrated in FIG. 12.

Figure 12:
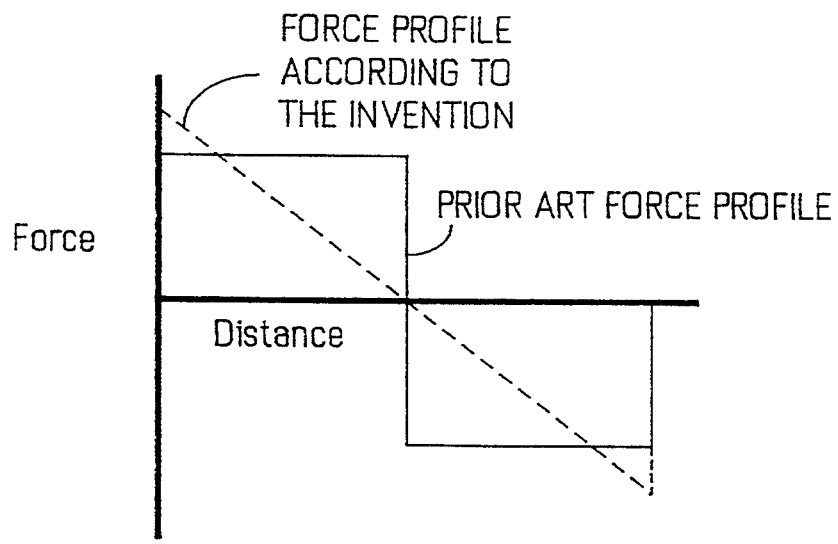
FIG. 12 shows a force profile that varies linearly with door location, thus giving torque cancellation throughout the door travel, according to the present invention.
Figure 13:
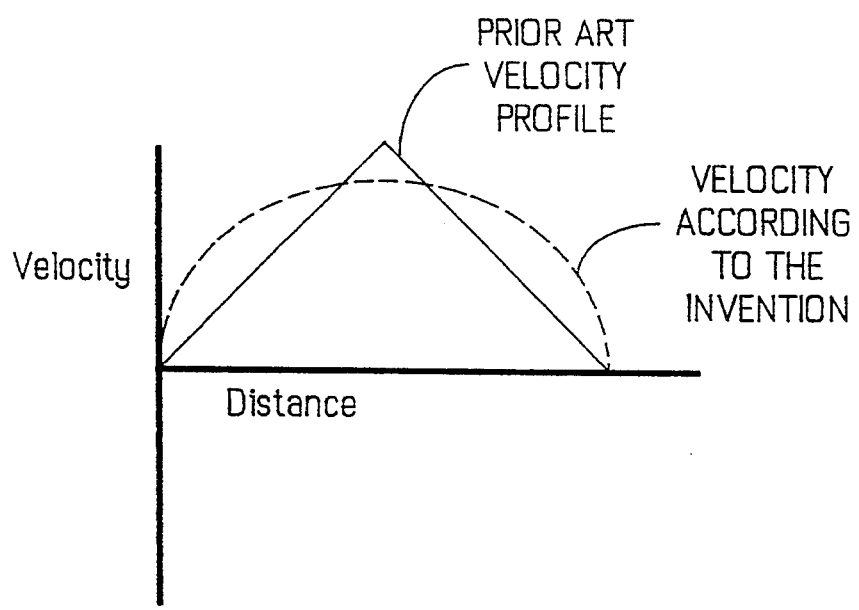
FIG. 13 shows a velocity profile, according to the present invention.

The standard force profile normally used with power-operated doors is also shown in solid lines in FIG. 12. The normally used force profile is discontinuous, with the maximum positive force being applied over the first half of the travel range and the maximum negative force being applied over the final half of the travel range. Use of this force profile results in the triangular velocity profile shown in the solid line in FIG. 13. The sharp peak of this velocity profile contributed to noise and rough door motion in the prior art. In contrast, the torque counterbalance force profile shown in dashed lines in FIG. 12 results in a velocity profile having a smooth peak, as shown in FIG. 13.

In summary then, the $F_{LINEAR}$ force driving the door produces a torque about the center of gravity of the door which varies linearly with door position due to the varying force $F_{LINEAR}$, as described herein. The attractive force $F_{NORMAL}$ produces a torque in a sense opposite to that of $F_{LINEAR}$ and also varies linearly with door position due to the change in moment arm. By selecting the proper value of the $F_{NORMAL}$ force, and door acceleration A, a perfect balance of torques can be achieved at all points in the door travel.

As has already been suggested, it is the central teaching of the present invention to vary the magnetic force along the length of the door travel so as to exactly oppose all or part of the torque created by not driving the doors at the center of gravity. This force distribution which opposes the torque may be generated, according to the teachings of FIG. 10, by making the product of the $X_{CG}$ moment arm and the $F_{NORMAL}$ force equal to the product of the $Y_{CG}$ and the $F_{LINEAR}$ force throughout the travel of the door. This is the same concept already discussed in connection with FIG. 7. Since the $X_{CG}$ moment arm represents the horizontal distance between the center of gravity of the door and the stationary primary, and since such horizontal distance changes depending on the position of the door, it is the teaching of the present invention to take this changing length moment arm into account in calculating the amount of linear force ($F_{LINEAR}$) to apply to the door in the horizontal direction as it moves. To satisfy the equation shown in FIG. 10, i.e.

$$, F_{NORMAL} \times X_{CG} = F_{LINEAR} \times Y_{CG}$$

along the entire span of operation of the door will thus (since the horizontal moment arm ($X_{CG}$) changes according to the position of the door) require the horizontal linear force ($F_{LINEAR}$) to change also in a proportionate manner to keep the equation balanced. In this way, the rotational torques that would otherwise be produced are cancelled.

This force distribution which opposes the torque may be generated by the following means:

A. A set of algorithms programmed into the computer control system 50 of FIG. 4, or similar system which determines the horizontal force applied to the door at any time (after a door open or close command) and calculates the correction torque required accordingly. This requires the pre-programmed information to in effect represent a simulation of the entire system by the computer control system (or similar control system) whereby the forces are controlled in an open-loop fashion.

B. Measurement of the force and/or position acceleration or velocity of the door and the feeding back of this information to the computer control system 50 (or similar control system) in a closed-loop system which uses the sensed information for comparison to a profile-generated command to calculate the required correction torque at any time.

Figure 11:
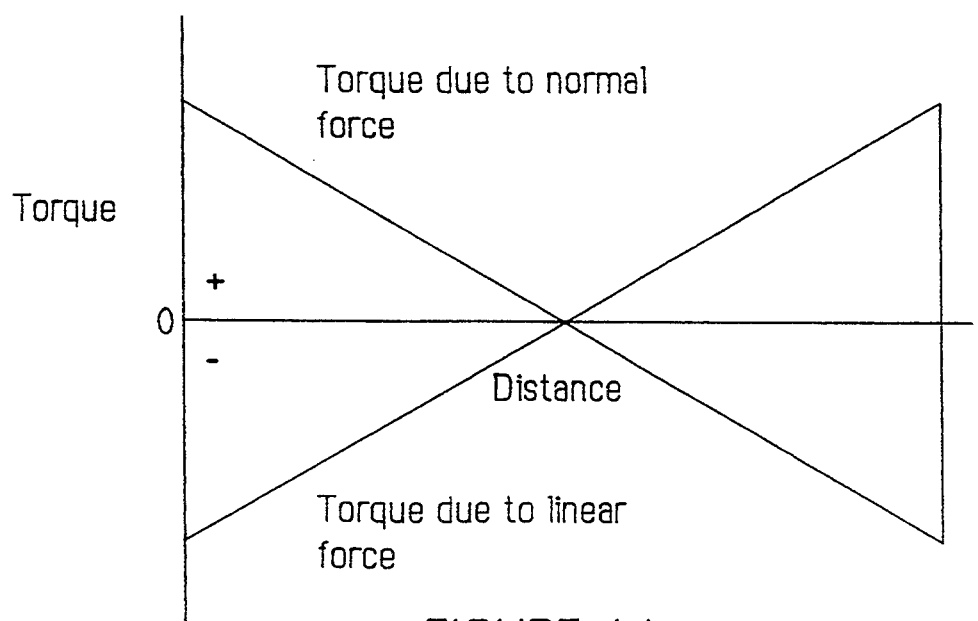
FIG. 11 shows the balancing of the torque due to the linear force with the torque due to the normal force, according to the present invention.
Figure 10:
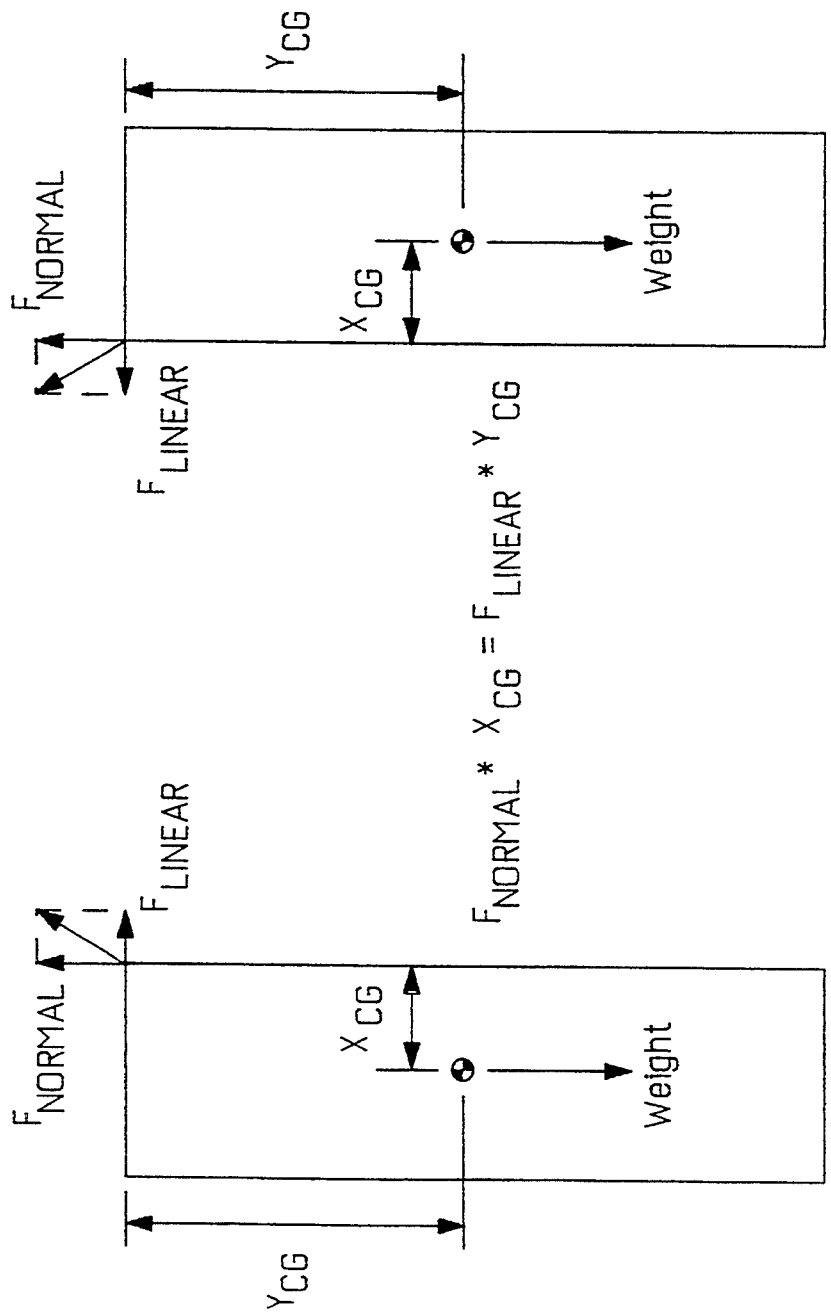
FIG. 10 shows torque cancellation, according to the present invention.

Due to the normal force being kept constant but having a variable moment arm, according to the embodiment described above, and due to the linear force having a constant moment arm but a variable force, as shown in FIG. 10, the force profile in the dashed line in FIG. 12, according to the present invention, may vary linearly with door location, thus giving torque cancellation throughout the door travel, as shown in FIG. 11. It will be understood from FIG. 12 that, to maintain the same operation time as obtained in the prior art of FIG. 1, the peak force for the linear motor profile (dashed line) is somewhat greater than with the fixed force profile (solid line) of the prior art.

Similarly, as shown in FIG. 13, the velocity profile (dashed line) using the linear force of FIG. 12 can be selected as shown to be much smoother than the solid profile shown using the prior art fixed-force profile of FIG. 12.

The equation for the velocity curve (dashed line) of FIG. 13 due to the linear force profile of FIG. 12 may be represented by the following equation:

$$V = \sqrt{2ax(1 - x/x_T)},$$

where
a = acceleration of the door,
$x_T$ = total distance covered by the opening or closing operation.
x = present position as measured with increasing plus or minus magnitude from a selected zero point in the total distance $X_T$.

As suggested above, it is a further teaching of the present invention to completely or partially oppose the gravitational force on the door system using magnetic repulsive or attractive forces provided by a linear motor, such as described above.

The standard door roller tires compress approximately 0.25 mm under the normal door weight. If the door is lifted 0.10 mm, the load on the door rollers decreases to approximately 60 percent of the door weight. The normal force component of the linear motor provides the lifting force to balance the door and the level of normal forces controlled by the primary-secondary gap.

The fraction of door weight on the door rollers is thus related to the desired door horizontal acceleration. We therefore have a partial magnetic suspension door due to the requirement for a torque-balancing normal force.

Figure 15:
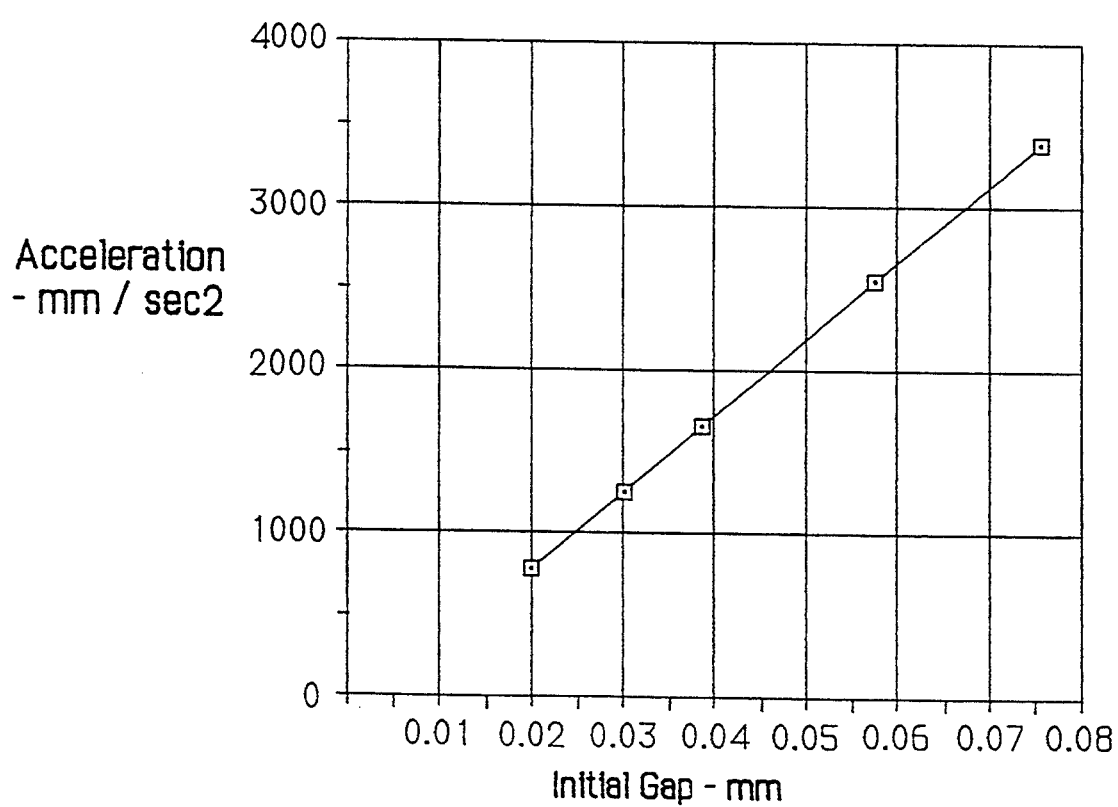
FIG. 15 shows the relation between initial gap and acceleration required for torque counterbalance, for a scale model door test rig, according to the present invention.
Figure 14:
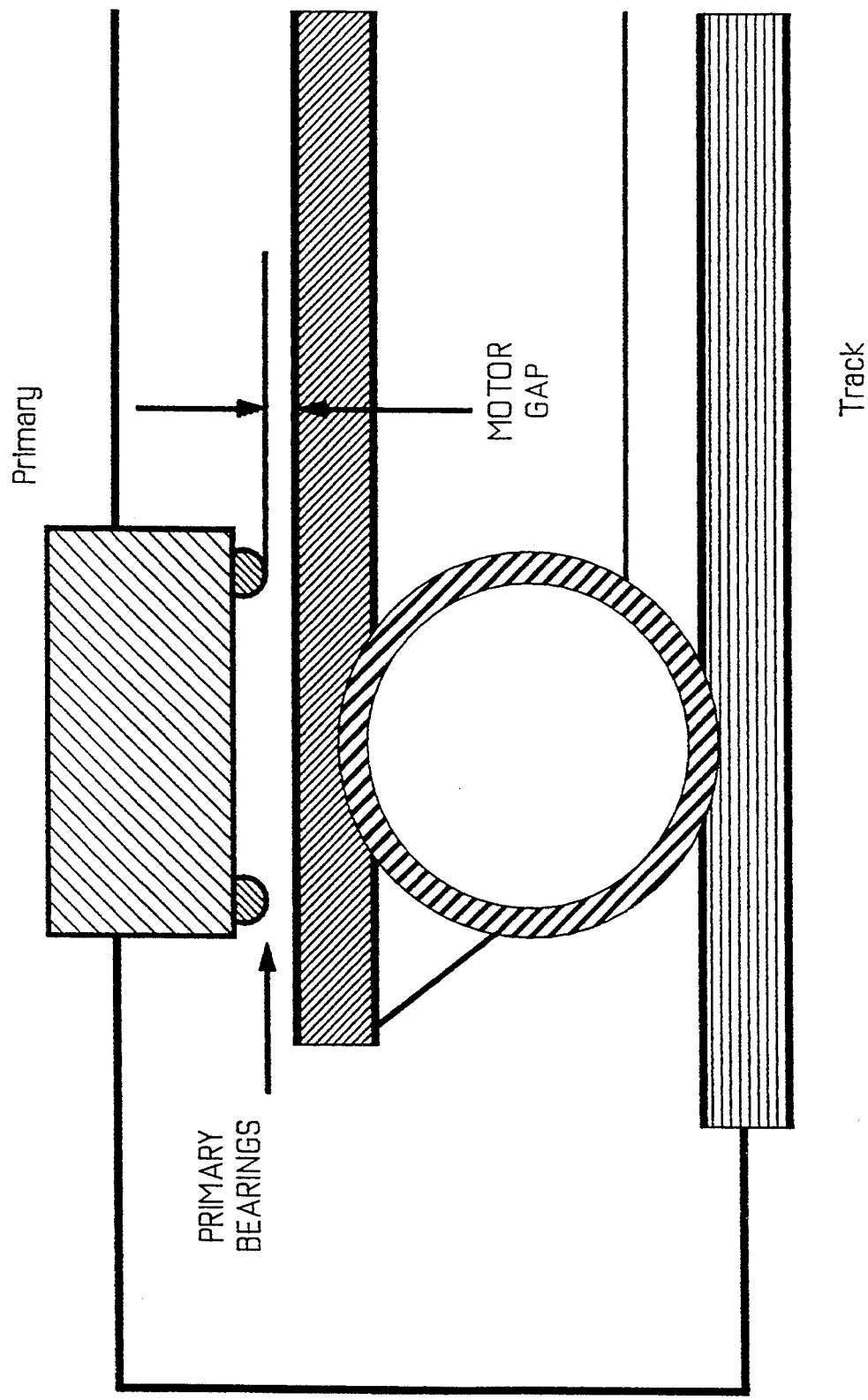
FIG. 14 shows the linear motor schematic of FIG. 6 in more detail, showing a motor gap which is important for achieving a balanced acceleration, according to the present invention.

The motor gap is shown in FIG. 14. We have found that balanced acceleration is a sensitive function of the initial gap, as shown in FIG. 15, where the gap for perfect torque cancellation as a function of acceleration is shown. This data was obtained from a sealed model of an elevator door system.

A planar 3 degree of freedom dynamic simulation of the subject door system has been developed and was used to develop the theory and implementation of the presently-disclosed invention.

Figure 17:
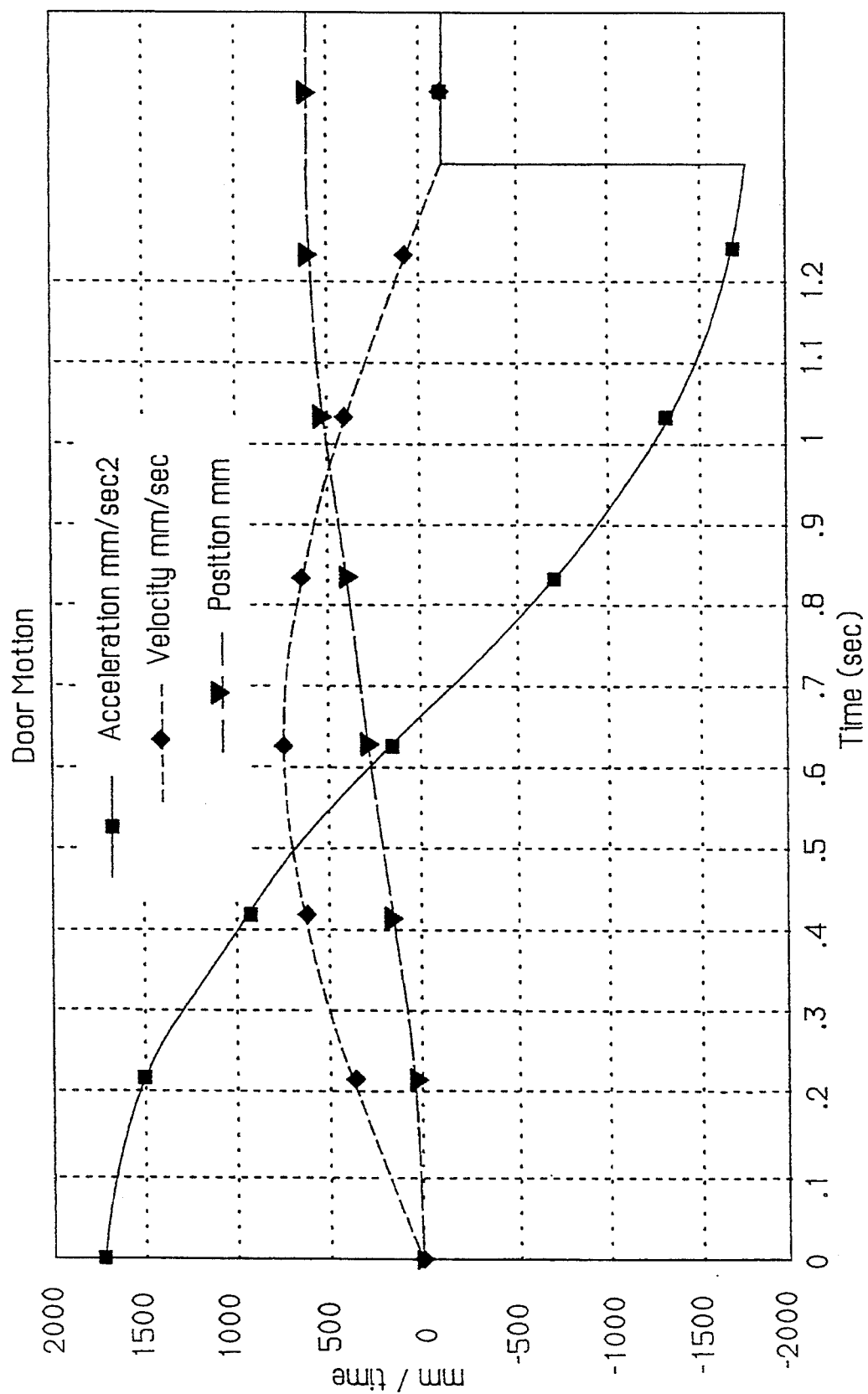
FIG. 17 shows door motion, including acceleration, velocity and position plotted against time, according to the present invention.
Figure 18:
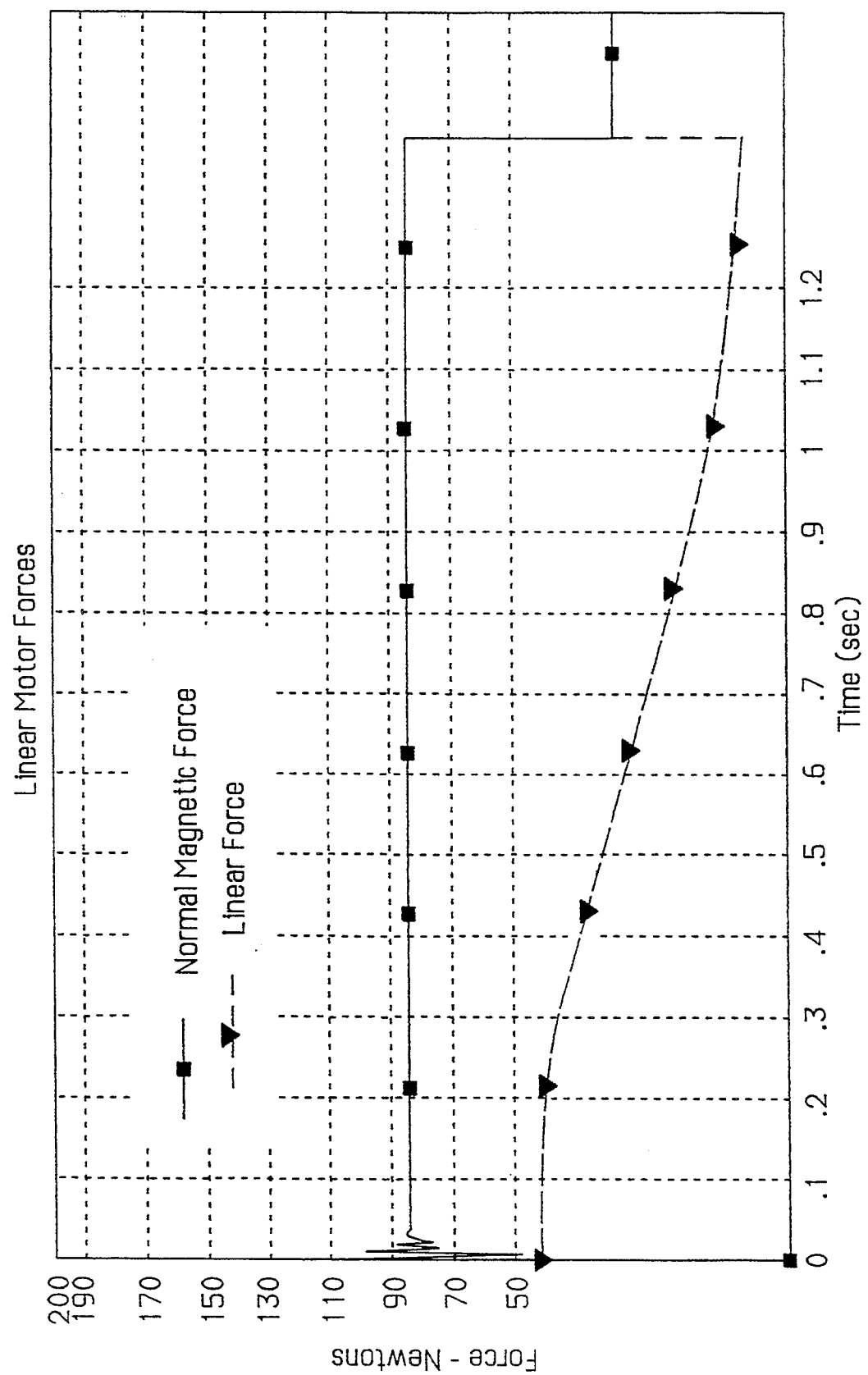
FIG. 18 shows linear motor forces, including normal magnetic force and linear force plotted against time, according to the present invention.
Figure 19:
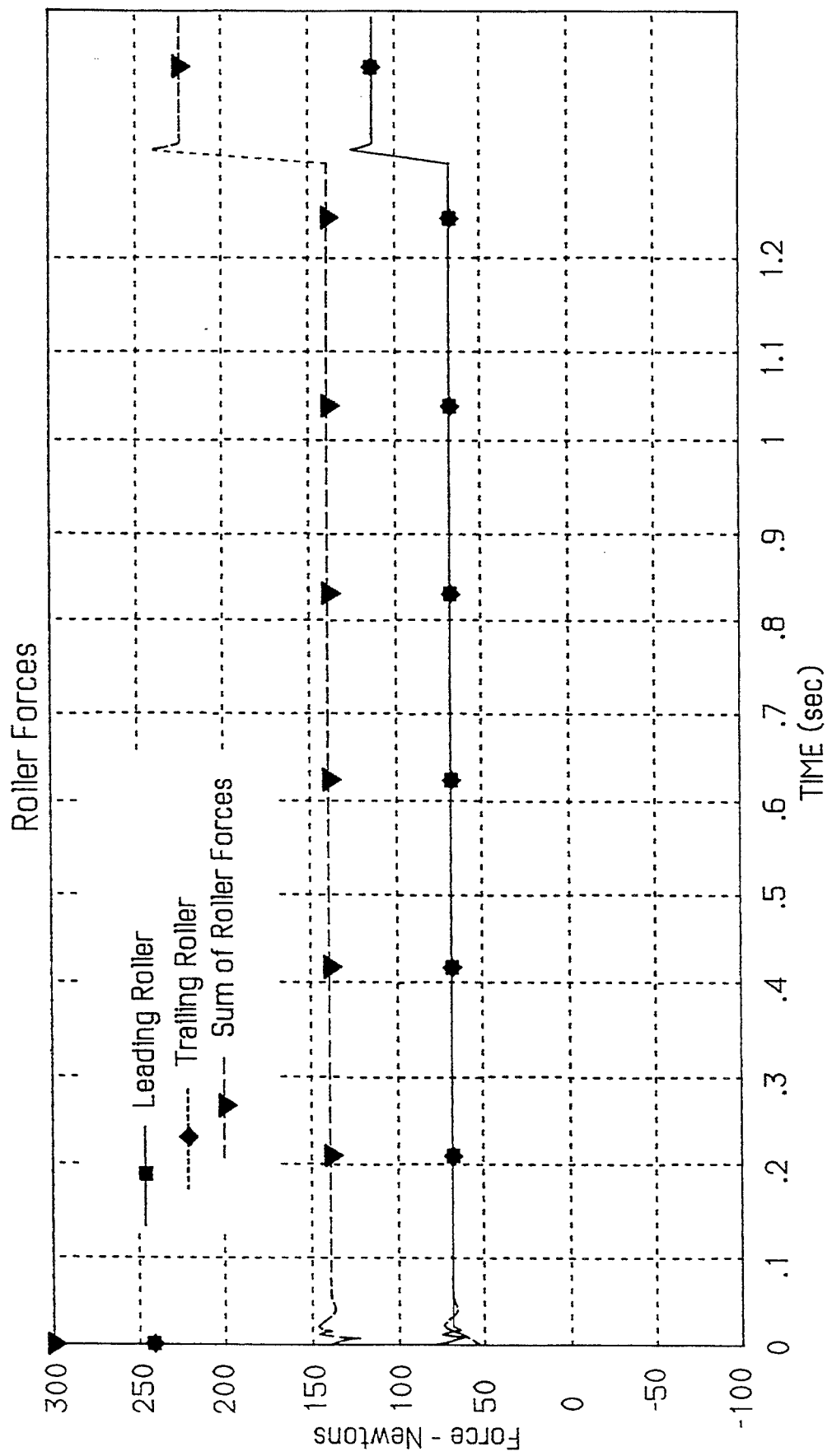
FIG. 19 shows roller forces, including leading roller, trailing roller and the sum of roller forces plotted against time, illustrating that the leading and trailing roller forces are identical, thereby showing perfect torque cancellation, according to the present invention.

FIG. 16 shows simulation results of vertical position and rotation of the door, FIG. 17 shows door motion, FIG. 18 shows linear motor forces described previously in connection with FIG. 10, and FIG. 19 shows roller forces described above.

FIG. 16 shows that the torques on the door are balanced (rotation = zero) and that the door is lifted slightly (approximately 0.03 mm), in this case by the normal force. This lifting corresponds to the weight reduction on the door rollers due to the linear motor normal force. Naturally, the amount of lift realized on a door is a function of the roller stiffness, door weight and acceleration specified.

The acceleration, velocity and position traces shown in FIG. 17 correspond to the $$F = F_{MAX}(1 - 2X/D)$$

profile described previously with $F_{MAX}$ selected to give an acceleration of 1,707 mm/sec$^2$. Note that these profiles are shown in FIG. 17 as a function of time rather than distance, as described previously. FIG. 18 shows the $F_{NORMAL}$ and $F_{LINEAR}$ forces associated with this particular case.

These details of the configuration, force levels and accelerations, velocities and positions are sufficient to enable anyone of ordinary skill in the art to reproduce both the analytical and the experimental tests that formed the basis of the invention described herein.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of moving an elevator door with a linear motor, comprising the steps of:

providing a control signal for counteracting a first rotational torque on the elevator door that varies in magnitude with horizontal movement of the door, wherein the first rotational torque is caused by a vertical force exerted vertically on the door by the linear motor acting through a variable-length moment arm about a center of gravity of the door for levitating or tending to levitate the door; and varying, in response to the control signal, the magnitude of a horizontal force for causing the horizontal movement of the door and exerted horizontally on the door by the linear motor acting through a fixed-length moment arm about the center of gravity of the door, for providing a second rotational torque opposing the first rotational torque, thereby counteracting the first rotational torque.

2. The method of claim 1, wherein for an opening or closing operation, the first and second rotational torques decrease with a decreasing length of the variable-length moment arm to zero at a point where the variable-length moment arm is zero, whereafter the first and second rotational torques increase with an increasing length of the variable-length moment arm until the door opening or closing operation is completed.

3. The method of claim 2, wherein the first and second rotational torques decrease and increase linearly.

4. The method of claim 1, wherein for an opening or closing operation, a horizontal velocity (V) of the door varies according to a relation $$V = \sqrt{2ax(1 - x/x_T)},$$

where
a = acceleration of the door,
$x_T$ = total distance covered by the opening or closing operation.
x = present position as measured with increasing plus or minus magnitude from a selected zero point in the total distance $x_T$.

5. The method of claim 1, wherein the vertical force for levitating or tending to levitate the door is for reducing gravitational forces acting on horizontal door motion guide means.

6. The method of claim 5, wherein the vertical force is held constant.

7. The method of claim 1, wherein the step of providing is carried out in response to a sensed door position signal.

8. Apparatus for moving an elevator door with a linear motor, comprising:

means for providing a control signal that varies in magnitude with horizontal movement of the door, for counteracting a first rotational torque on the elevator door caused by a vertical force exerted vertically on the door by the linear motor acting through a variable-length moment arm about a center of gravity of the door for levitating or tending to levitate the door; and means, responsive to the control signal, for varying the magnitude of a horizontal force for causing the horizontal movement of the door and exerted horizontally on the door by the linear motor acting through a fixed-length moment arm about the center of gravity of the door, for providing a second rotational torque opposing the first rotational torque, thereby counteracting the first rotational torque.

9. The apparatus of claim 8, wherein the control signal is varied for an opening or closing operation so as to cause the first and second rotational torques to decrease with a decreasing length of the variable-length moment arm to zero at a point where the variable-length moment arm is zero, whereafter the first and second rotational torques increase with an increasing length of the variable-length moment arm until the door opening or closing operation is completed.

10. The apparatus of claim 9, wherein the control signal is varied so as to cause the first and second rotational torques to decrease and increase linearly.

11. The apparatus of claim 8, wherein the control signal is varied so as to cause a horizontal velocity (V) of the door to vary according to a relation $$V = \sqrt{2ax(1 - x/x_T)},$$

where
 a = acceleration of the door,
 $x_T$ = total distance covered by the opening or closing operation.
 x = present position as measured with increasing plus or minus magnitude from a selected zero point in the total distance $x_T$.

12. The apparatus of claim 8, wherein a second control signal is provided to the linear motor for controlling the vertical force for levitating or tending to levitate the door to reduce gravitational forces acting on horizontal door motion guide means.

13. The apparatus of claim 12, wherein the vertical force is held constant.

14. The apparatus of claim 8, wherein the means for providing a control signal is responsive to a sensed position signal.

15. The apparatus of claim 8, wherein the linear motor comprises:
 a primary; and
 a non-segmented secondary.

16. The linear motor of claim 15, wherein the secondary is a solid, magnetic permeable material covered with a sheet of conductive material.

17. The linear motor of claim 15, wherein the secondary is integral to or attached rigidly to the elevator door.

18. The linear motor of claim 8, wherein a secondary of the linear motor is integral to or attached rigidly to the elevator door.

19. The linear motor of claim 15, wherein the primary is mounted on the elevator such that the vertical force exerted on the door acting through the variable-length moment arm about the door center of gravity varies linearly with door position and is zero when the door is at a midpoint of its travel range.

20. The linear motor of claim 8, wherein a primary of the motor is mounted on the elevator such that the variable-length moment arm varies linearly with door position and is zero when the door is at a midpoint of a travel range thereof.

* * * * *